(12) United States Patent
Wübbels et al.

(10) Patent No.: US 7,165,384 B1
(45) Date of Patent: Jan. 23, 2007

(54) CROP PICKING HEAD WITH ROAD TRAVEL SUPPORT DEVICE

(75) Inventors: Richard Wübbels, Rhede (DE); Thomas Lukas, Ahaus-Wüllen (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 11/301,544

(22) Filed: Dec. 13, 2005

(51) Int. Cl.
*A01D 34/00* (2006.01)
(52) U.S. Cl. .................................................... 56/15.6
(58) Field of Classification Search ................ 56/15.6, 56/2, 15.3, 16.3, 14.7, 228
See application file for complete search history.

(56) References Cited

U.S. PATENT DOCUMENTS

| | | | | |
|---|---|---|---|---|
| 3,683,605 A | * | 8/1972 | Jakobi | 56/228 |
| 3,822,534 A | * | 7/1974 | Martin | 56/13.9 |
| 4,360,215 A | * | 11/1982 | Nohl et al. | 280/413 |
| 4,463,546 A | * | 8/1984 | Day | 56/364 |
| 5,243,810 A | | 9/1993 | Fox et al. | |
| 5,291,954 A | | 3/1994 | Kirwan | |
| 6,282,875 B1 | * | 9/2001 | Holtkotte et al. | 56/228 |

FOREIGN PATENT DOCUMENTS

| | | |
|---|---|---|
| EP | 0 760 200 | 3/1997 |
| EP | 0 789 990 | 8/1997 |
| EP | 1 046 329 | 10/2000 |

* cited by examiner

*Primary Examiner*—Árpád Fábián Kovács

(57) ABSTRACT

A combination of a harvesting machine, a crop picking head, and a vehicle to support the crop picking head. The vehicle features a mount and at least one wheel extending down from the mount that supports the crop picking head and alleviates the weight on the front wheels of the self-propelled harvesting machine when driving on the road. The vehicle is attached to the crop picking head when driving on the road and detached from the crop picking head when harvesting a field. The crop picking head includes a support frame which supports the harvesting equipment. In the preferred design, the mount is connected such that the support forces of the vehicle pass directly to the support frame rather than load more fragile components of the crop picking head.

6 Claims, 4 Drawing Sheets

CROP PICKING HEAD WITH ROAD TRAVEL SUPPORT DEVICE

BACKGROUND OF THE INVENTION

1. Field of the Invention

The present invention generally relates to agricultural machinery for the harvesting of fields. More specifically, the invention relates to mounting a removable support vehicle to a crop picking head used on a self-propelled harvester.

2. Description of Related Art

Crop picking heads for harvesting and gathering crops are necessary attachment on self-propelled harvesting machines. Recently, due to the increased performance of harvesting machines ever wider and heavier crop picking heads are being used. While cutting tools for combine harvesting machines are usually rigid and must be separated from the combine harvesting machine and placed on a trailer for road transport, there are also foldable cutting tools for combine harvesting machines. In addition, corn pickers for combines and corn picker heads for field choppers are normally designed to fold. Thus, the exterior side parts of the crop picking heads are swung into a transport position, usually upward or inward and they remain fastened to the front part of the harvesting machine during road transport. However, this can mean the maximum legal load permissible on the front wheels of the harvesting machine may be exceeded.

In U.S. Pat. No. 6,282,875, a suggestion was made to provide an additional wheel to support the crop picking head, which can come into contact with the ground during road transport of the harvesting machine. This provides additional support, which eases or facilitates compliance with the legal regulations. In one embodiment, the additional wheel is attached to a separate vehicle that may be pushed under the crop picking head and fastened there. The fastening of the vehicle, and therefore the introduction of supporting forces, takes place on a transmission housing of a mowing and feeder drum, which extends forward from a lower support frame of the crop picking head, as well as on the underside of the feeder housing of the harvesting machine.

The above configuration is problematical since the transmission housing of a crop picking head as well as the feeder housing of harvesting machines are not designed for absorbing road transport loads. In order to withstand the stresses caused by road transport, particularly those caused by uneven stretches often found near agricultural areas, these housing would require significant reinforcements, causing increases in weight and cost.

In view of the above, it is apparent that there exists a need to attach a vehicle to a combination harvester and crop picking head that does not transfer loads through the transmission and feeder housings. Therefore, it is an objective of this invention is to provide a vehicle wherein the weight of the crop picking head is supported independently of the transmission and feeder housings.

BRIEF SUMMARY OF THE INVENTION

In satisfying the above need, as well as overcoming the enumerated drawbacks and other limitations of the related art, the present invention discloses a vehicle, for the support of a crop picking head on a self-propelled harvester for over-the-road transport, designed to transfer the support loads to a support frame of the crop picking head itself.

More specifically, the invention concerns the combination of a harvesting machine, a crop picking head, and a vehicle to support the crop picking head wherein in the vehicle features a mount and at least one wheel extending downward from the mount. The vehicle supports the crop picking head and alleviates the weight of the crop picking head on the front wheels of the self-propelled harvesting machine during road travel. The vehicle is also detachable from the crop picking head for harvesting operations in a field. The crop picking head includes a support frame which interfaces with the harvesting machine and to which the vehicle is attached. This configuration facilitates the task of providing a vehicle for supporting the crop picking head in a stable manner during road transport.

The support frame of the crop picking head directly or indirectly supports the equipment for the harvesting of crops. The support frame is designed to be strong enough to support the individual elements of the crop picking head, and therefore is also suitable for absorbing the supporting forces of the vehicle. It is proposed to transfer the supporting forces that the vehicle exerts on the crop picking head during road travel, directly from the mount to the support frame without using other elements of the crop picking head.

Although it is conceivable to have elements of the mount engage directly from below on the support frame, for which U-shaped shells or brackets could be used that embrace the support frame from below or engage into an opening in the support frame, it is proposed in a preferred embodiment of the invention to fasten, in particular to weld, one or several brackets to the support frame, with which the mount of the vehicle interacts. An advantage therein is that the vehicle can be fixed by the brackets not only in a vertical and forward direction, but also in a lateral direction.

The mount of the vehicle can be made up of a front part and a rear part. On its underside, the front part supports the wheel connected thereto, normally in a rigid or trailingly steerable manner, while the rear part is positioned behind and lower than the front part. In the mounted state, i.e. during the road travel, the harvesting equipment of the crop picking head is found above the rear part. The front part can accommodate and support the separator tips of the crop picking head. Through this arrangement, a relatively large and therefore easy-running wheel can be used without having to lift the crop picking head to a greater extent for road transport.

Current support frames of crop picking heads normally comprise an upper cross bar and/or a lower cross bar. An upper cross bar extends horizontally and transverse to the forward direction, above a feed opening of a feeder housing of the harvesting machine, either over the entire width of a middle part of the crop picking head (equipped with foldable side parts) or over only a part thereof. In the former case, which is used in particular in foldable crop cutting tools (see EP 0 789 990 A) the upper cross bar normally supports the feeder equipment of the crop picking head. In the latter case (see U.S. Pat. No. 5,722,225) the upper cross bar is normally connected to a lower cross bar, which extends horizontally and transverse to the forward direction underneath the loading opening of the feeder housing of the harvesting machine and on its end supports the feeder equipment. Here, the upper cross bar is for mounting the crop picking head supporting structures, against whose underside complementary supporting structures of the feeder housing rest when the crop picking head is placed on the harvesting machine. The vehicle according to the invention preferably acts together with the described upper cross bar and/or lower cross bar.

An upper cross bar may be connected to the mount of the vehicle by a brace. This brace is in particular fastened in a swiveling manner to the front part of the vehicle, e.g., around an axis running horizontally and transverse to the forward direction. It can be moved between a transport position, where it is above the feeder equipment of the crop picking head, and an out-of-service position, where it is swung forward and facilitates easy positioning of the crop picking head above the vehicle.

A lower cross bar is, on the other hand, preferably connected to the rear part of the vehicle. In another embodiment, a cradle frame mounted in pendulum fashion on the crop picking head consists of the upper support and vertical supports positioned on both sides of a feeder housing of the harvesting machine. The vertical support may be connected to the rear section of the rear part.

The above mentioned and other aspects and advantages of the present invention will become apparent upon reading the following detailed description of the invention in combination with the accompanying drawings.

DETAILED DESCRIPTION OF THE INVENTION

Figure 1:
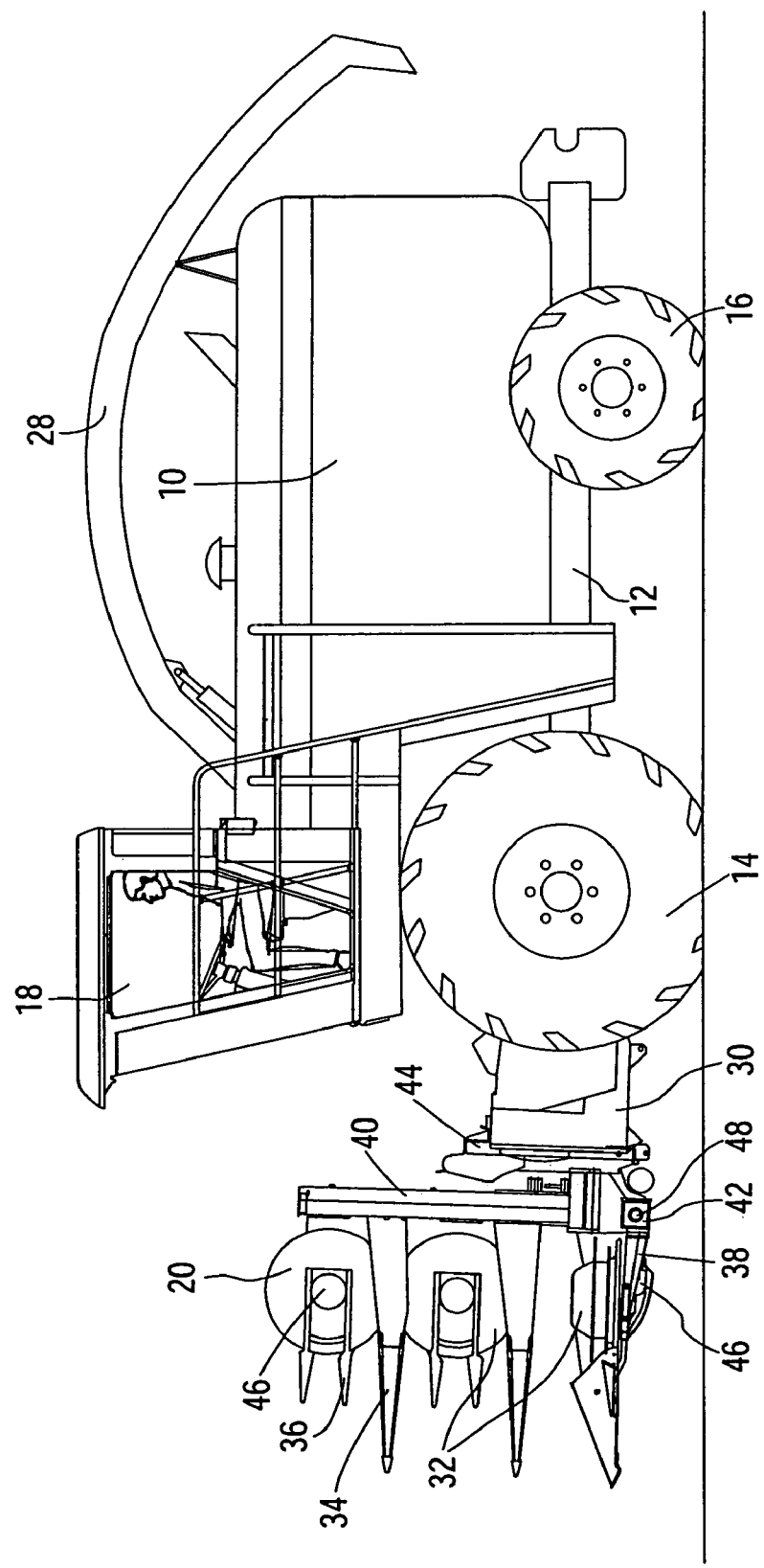
FIG. 1 illustrates a harvesting machine with a crop picking head attached.

An agricultural harvesting machine 10 is shown in FIG. 1 in the style of a self-propelled forage harvester and is comprised of a chassis 12 supported by front and rear wheels 14 and 16. The front wheels 14 serve as main drive wheels, while the rear wheels 16 are steerable. The harvesting machine 10 is operated from an operator's cabin 18, from where a crop picking head 20 is visible. Crops, such as corn, sunflower or sorghum, picked by means of the crop picking head 20 are fed via a feeder housing 30 to a chopping drum (not shown) inside the harvesting machine 10, which chops the crop into small pieces and loads it onto conveying machinery (not shown) within the machine 10. The crop is then emptied from the harvesting machine 10 via a rotatable discharge chute 28 into a trailer driving alongside or behind. A secondary crusher, not shown in the drawing, may be positioned between the chopping drum and the conveying machinery. Although the invention is being shown on a field chopper, it may also be used on combine harvesting machines with appropriate crop picking heads, such as cutter bars or maize pickers, or other machines. In the following, directions such as in front, behind, laterally and above, refer to the forward direction of the harvesting machine 10 and the crop picking head 20, which is to the left in FIG. 1.

As indicated above, the crop picking head 20, fastened in the forward direction on the front end of the harvesting machine 10, picks up the harvested crops. In the embodiment shown, the crop picking head 20 is a known corn picker head, comprising a middle part 38 and two side parts 40 laterally positioned to the left and right of the middle part 38. For road transport, the side parts 40 are attached on pivots to the middle part 38 and can be raised hydraulically. For harvesting, the side parts 40 can be lowered to run parallel with the middle part 38. Afterwards, they can be raised again. FIG. 1 illustrates the side parts 40 in the raised state.

In the illustrated construction, four mowing and feeder drums 32 are positioned on the center part 38, while two mowing and feeder drums 32 are positioned on each of the two side parts 40. In general, the crop picking head 20 is equipped in a known manner with outer dividers 36, the mowing and feeder drums 32, separator tips 34 and covers and conveyors that feed the harvested crop to the chopping drum of the harvesting machine 10. During operation, the crop picking head 20 pulls in the stalks of the cut crop in an upright position, cuts them and feeds them to the feeder housing 30 and subsequently to the chopping drum of the harvesting machine 10.

The above components of the crop picking head 20 are mounted to a support frame, which has a hollow lower cross bar 42 and an upper cross bar 44. The lower cross bar 42 extends underneath the rear of the crop picking head 20 and includes three segments, of which one is positioned as the center part 38 and one on each side part 40. Transmission housings 46, which each drive a mowing and feeder drum 32, are bolted onto the front part of the lower cross bar 42. A drive shaft 48, driven by a power take off of the harvesting machine 10, extends laterally within the lower cross bar 42 and powers the conveyors of the crop picking head 20 and the mowing and feeder drums 32 via gears in the transmission housing 46.

The upper cross bar 44 extends laterally across the width and above the entrance of the feeder housing 30. Hook-shaped supporting members 50 and 52 are provided on the top side of the feeder housing 30 (shown in FIG. 4), which support the upper cross bar 44 and fasten the crop picking head 20 to the harvesting machine 10. The upper cross bar 44 is connected to the lower cross bar 42 via roller bearings and by means of vertical supports 54 and connecting plates 56, so that the lower cross bar 42 is pivotable with respect to the upper cross bar 44 about an axis running horizontally and in the direction of motion, approximately through the center point of the feeder housing 30.

The cross bars 42, 44, the vertical supports 54 and the connecting plates 56, as well as side supports 57, form the support frame of the crop picking head 20 that supports all the above elements of the crop picking head 20. The upper cross bar 44 is connected on both sides of the feeder housing 30 to the side supports 57 running vertically downward, which may be connected at their lower end to the underside of the feeder housing 30. The upper cross bar 44 and the side supports 57 thus form a cradle frame that allows the crop picking head to swing about the described axis running in the direction of motion.

Figure 2:
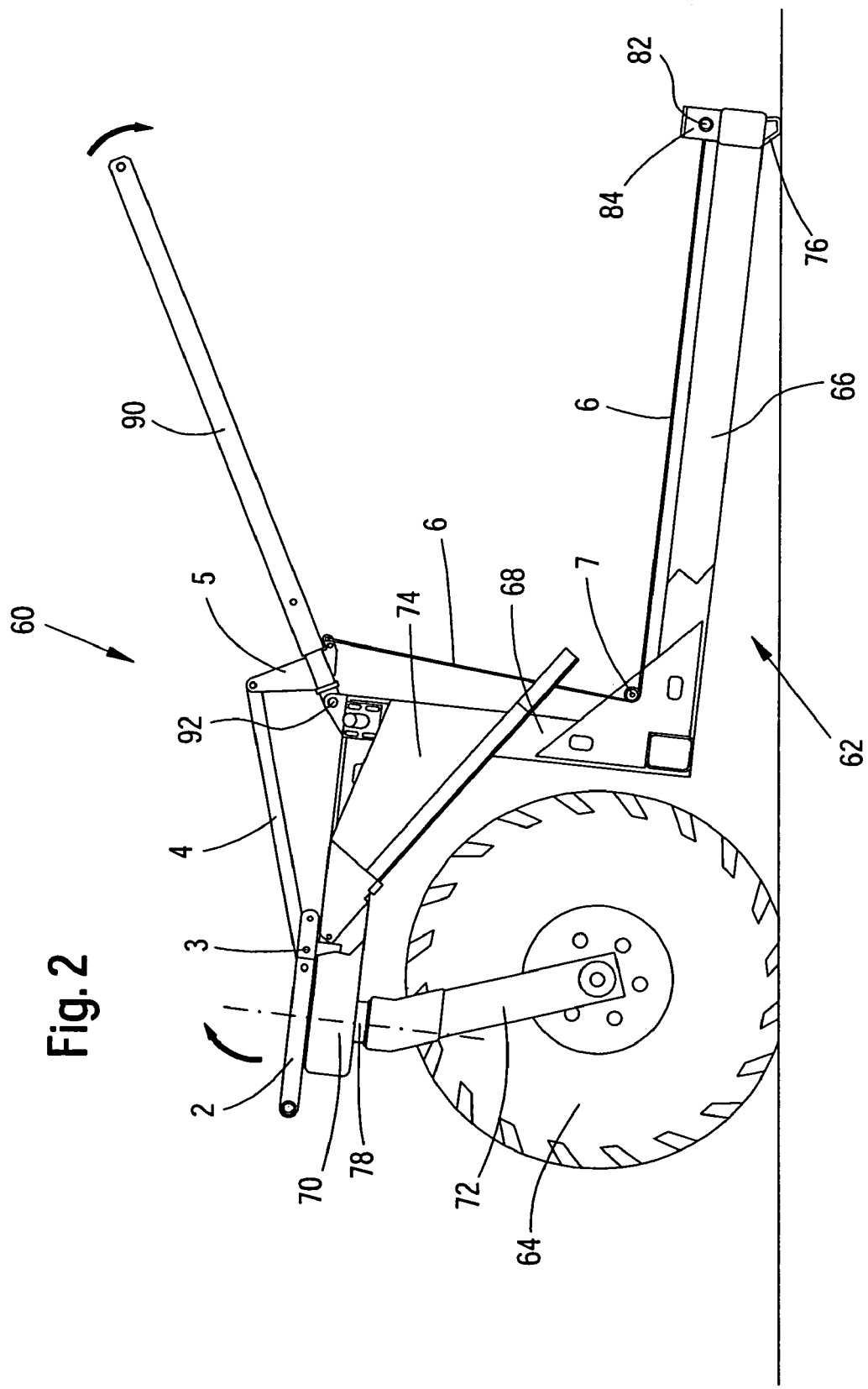
FIG. 2 a side view of a vehicle embodying the principles of the present invention, FIG. 3 a top view of the vehicle seen in FIG. 2.
Figure 3:
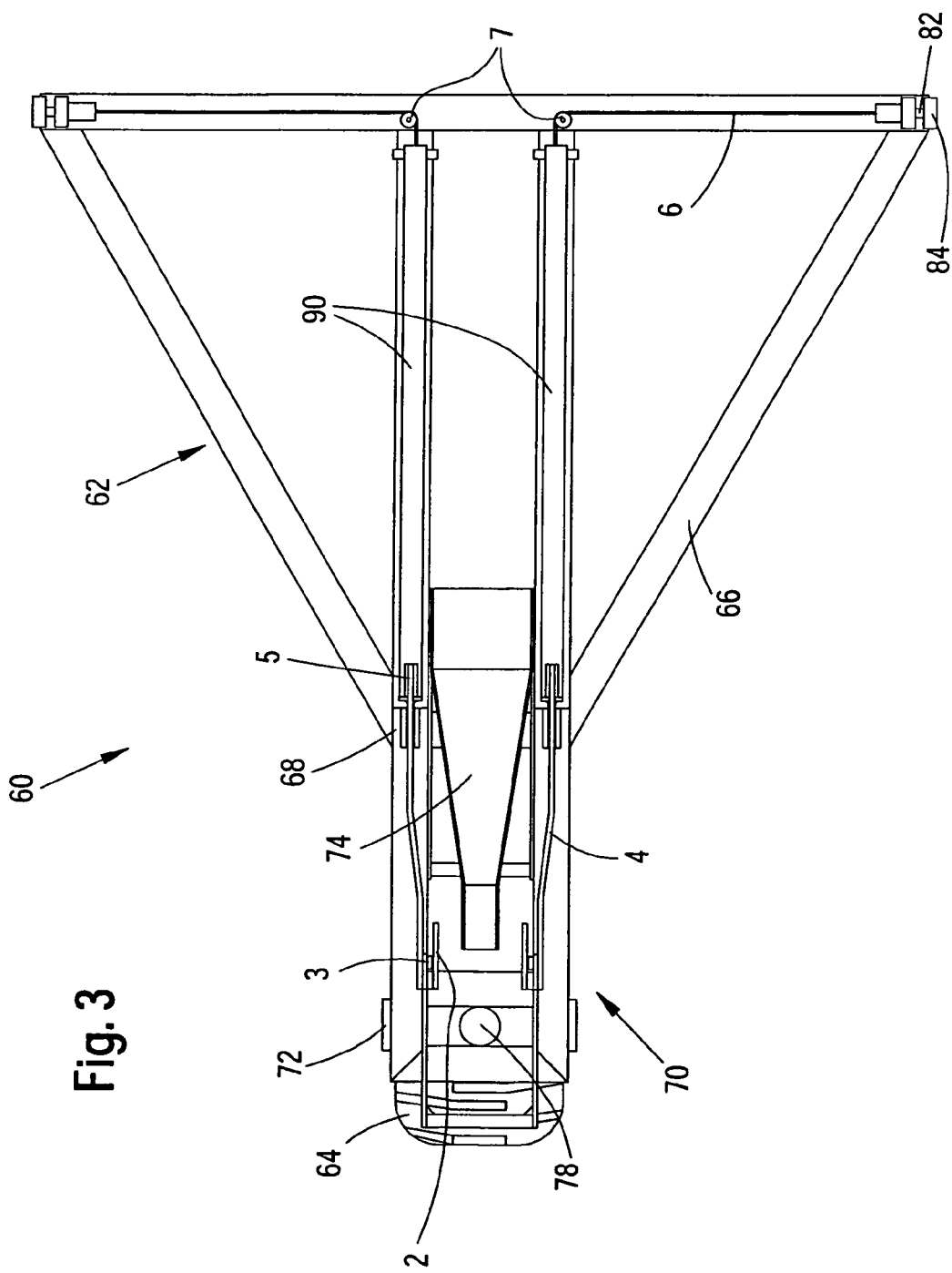

In FIG. 2, a side view of the vehicle 60 for supporting the crop picking head 20 during road travel is shown. It is made up of a mount 62 and a wheel 64. The mount 62 includes a rear part 66, which spreads out in a triangular fashion toward the back and is connected to a front part 70 via approximately vertically running braces 68, and wheel carriers 72 positioned beneath the front part 70, between which the wheel 64 is rotatably mounted on a shaft extending laterally. On the side of the front part 70 facing the rear part 66 is a vehicle positioning mechanism 74, which has a pocket or bag-like opening, shown directed to the right in FIG. 2, whose underside extends diagonally toward the back and downward as far as rear part 66. The vehicle positioning mechanism 74 is for automatically orienting the vehicle 60 with respect to the crop picking head 20. Rear supports 76 support the rear part 66 of the mount when resting on the ground. FIG. 3 shows a top view of the vehicle 60. In the illustrated embodiment, the wheel 64 is coupled in a trailingly steerable manner on the mount 62 around an approximately vertical pivot 78.

Figure 4:
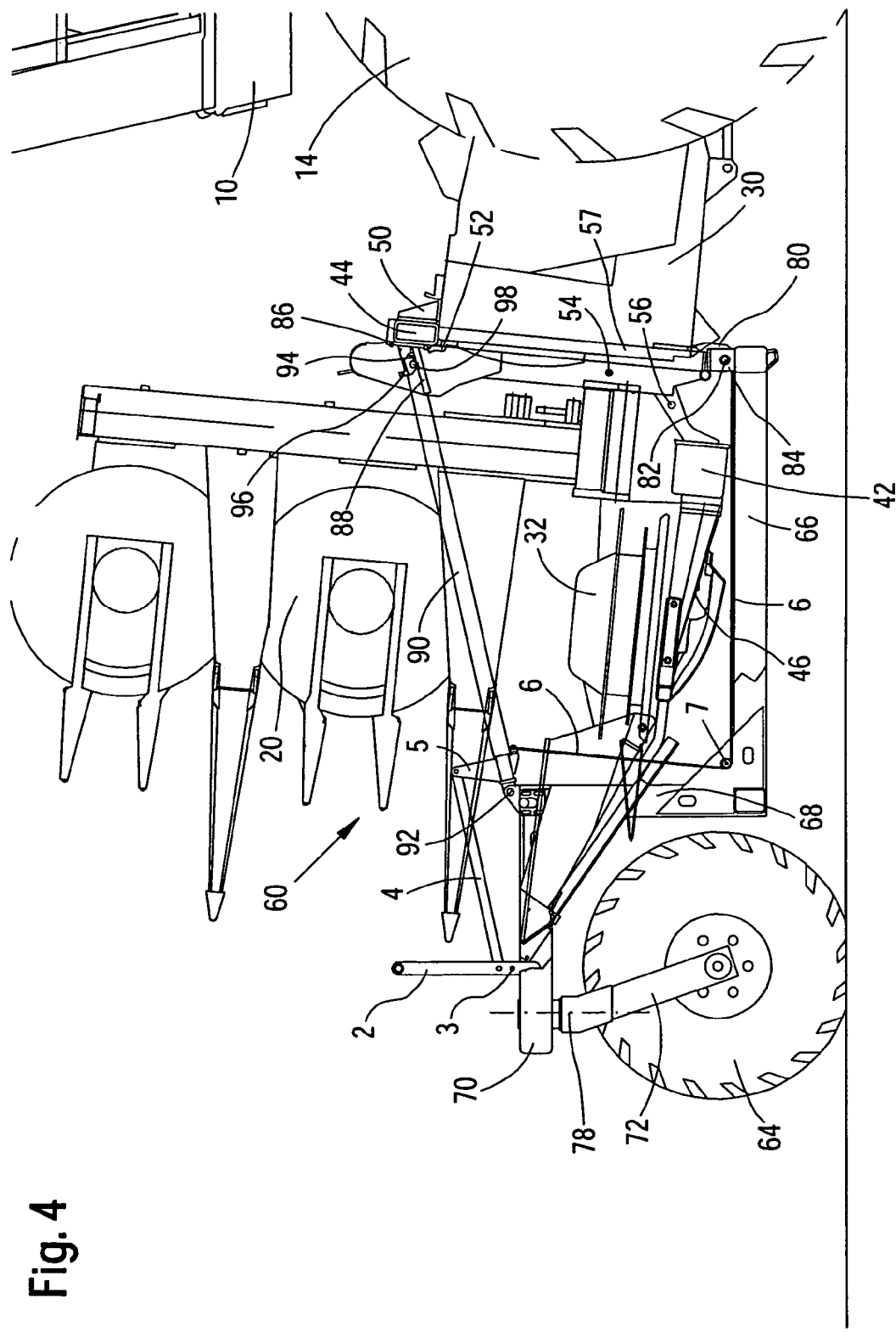
FIG. 4 a side view of the vehicle coupled to the harvesting machine and the crop picking head seen in FIG. 1.

In FIG. 4, the vehicle 60 is shown below the crop picking head 20, which is attached to the harvesting machine 10, and fastened to the support frame of the crop picking head 20. This configuration allows the vehicle 60 to take up a part of the weight of the crop picking head 20 in order to relieve the load on the wheels 14, 16 of the harvesting machine 10 during road travel.

The connection and load transmission between the support frame of the crop picking head 20 and the vehicle 60 occur at three locations. Two brackets 80 welded on the underside of the side supports 57 of the cradle frame are correspondingly connected to supports 84 fastened outside on the rear top side of the rear part 66 by means of removable spring-loaded pins 82. The spring-loaded pins 82 each extend through coaxial openings in the bracket 80 and in the support 84. In addition, the upper cross bar 44 is enclosed by two brackets 86 bolted thereto, positioned laterally side by side. Each bracket 86 further supports a receiving device 88. Bearing on each receiving device 88 is the rear end of one of two braces 90 (see FIG. 3) arranged laterally side by side and coupled at their front end around a horizontal shaft 92 running transverse to the forward direction on top of the rear portion of the front part 70 of the vehicle 60. Two latches 96, pivotably coupled to the receiving device 88 around a shaft 94, running horizontally and transverse to the forward direction, enclose from above a pin 98, which also runs horizontally and transverse to the forward direction, fastened to the rear of each brace 90.

The supports 84 direct the supporting forces of the vehicle 60 via the spring-loaded pins 82 and the brackets 80 directly into the side supports 57. The braces 90 pass their retention forces via the pin 98, the latch 96, the receiving device 88, and the brackets 86 directly into the upper cross bar 44. Through the chosen fastening of the vehicle 60 onto the support frame of the crop picking head 20, the force is led from the wheel 64 directly into the support frame. The mowing and feeder drums 32 and their respective transmission housings 46 are not in any way burdened by the vehicle 60. Oscillation of the crop picking head 20 is prevented by causing the lower cross bar 42 (or a plate on its under side) to bear on the rear part 66.

For simpler installation when mounting the vehicle 60 on the crop picking head 20, a single lever 2 is provided. The vehicle 60 can be fastened to the crop picking head by moving only the lever 2. The lever 2 is attached to the front part of the vehicle 60 around a shaft 3 running horizontally and transverse to the forward direction. Above the shaft 3, two rods 4 are pivotably coupled to lever 2, the rods being connected at their other end to an additional bracket 5, each fastened to the brace 90. In addition, a cable 6 is attached to the underside of the braces 90, the cable being connected via deflection pulleys 7 to the spring-loaded pins 82 and being used for their unlocking and locking. As a result, it becomes possible to place the braces 90 onto the pick-up device 88 by a movement of the lever 2 and at the same time to close the lower locks using the pins 82. Similarly, through a movement of the lever 2 in the opposite direction, the braces 90 can be swung upward and the pins 82 can be loosened.

When the vehicle 60 must be separated from the crop picking head 20 for the harvesting operation, the crop picking head 20 is raised by operating suitable hydraulic cylinders of the harvesting machine 10 to unburden the wheel 64. The latches 96 are loosened by the operator in the cabin 18 by means of a cable pull (not shown), which extends from at least one latch 96 into the cabin 18. Afterwards, the lever 2 is swung forward to lift the braces 90 and to bring the pins 82 into the released position. The harvesting machine 10 then moves backward. Attaching the vehicle 60 is done in the reverse sequence. To avoid having the operator leave the operator's cabin 18 to attach or remove the vehicle 60 from the crop picking head 20, locking devices actuated by an external force, e.g., hydraulic cylinders that can be controlled from the operator workstation in the operator's cabin 18, may also be provided to move the spring-loaded pins 82, the latch 96, and the braces 90.

The foregoing disclosure is the best mode devised by the inventor for practicing this invention. It is apparent, however, that methods incorporating modifications and variations will be obvious to one skilled in the art of agricultural machinery. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. In a harvester comprising a harvesting machine having front and rear support wheels, a crop feeder housing including a support frame and being mounted to a forward region of the harvesting machine, a harvesting head being mounted to said support frame, and a vehicle mounted to said support frame and supporting at least a portion of the weight of said harvesting head so as to alleviate a load carried on said front support wheels in an absence of such vehicle, the improvement comprising: said vehicle including a mount, which, when considered in an attached condition, includes a pair of substantially horizontal rear parts extending beneath said harvesting head and having rear ends releasably coupled to a lower region of said support frame and having front ends joined to and extending rearward from a substantially horizontal front part located in elevated relationship to said rear parts and extending to a location forward of said harvesting head; and a brace assembly having a rear end releasably coupled to an upper region of said support frame and having a front end coupled to said front part; and at least one wheel coupled to and extending downward from said front part, whereby reaction forces acting on said at least one wheel are delivered directly to said support frame by said mount during road travel.

2. The harvester of claim 1, including at least one bracket attached to the support frame to which the mount can be connected.

3. The harvester of claim 1, wherein said support frame includes an upper cross bar positioned above a feed opening of said feeder housing of the harvesting machine; and said brace assembly being coupled to said upper cross bar.

4. The harvester of claim 3, wherein said brace assembly has opposite ends respectively pivotally coupled to said upper cross bar and said front part.

5. The harvester of claim 3, further comprising a cradle frame mounted in pendulum fashion on the harvesting head, the cradle frame including the upper cross bar and side supports positioned on both sides of said feeder housing of the harvesting machine, wherein the side supports are removably attached to a rear section of said rear parts of said mount.

6. The harvester of claim 3, wherein the support frame includes a lower cross bar located below said feed opening of said feeder housing of the harvesting machine, the lower cross bar being connected to a rear section of said rear parts of said mount.

* * * * *